United States Patent [19]

Day et al.

[11] 3,929,949

[45] Dec. 30, 1975

[54] PROCESS FOR FORMING MICROPOROUS SHEET

[75] Inventors: John T. Day, Pasadena, Md.; John G. Hollick, Beverly, Mass.

[73] Assignee: USM Corporation, Boston, Mass.

[22] Filed: June 21, 1974

[21] Appl. No.: 481,780

[52] U.S. Cl. ............ 264/46.4; 260/2.5 AY; 264/41; 264/45.8; 264/321; 264/331; 428/264; 428/265; 428/305; 428/425; 428/904
[51] Int. Cl.² ........................................ B29D 27/04
[58] Field of Search .............. 264/41, 53, 45.8, 321, 264/331; 260/2.5 AY; 428/264, 265, 305, 425, 904

[56] References Cited
UNITED STATES PATENTS

| | | | |
|---|---|---|---|
| 3,539,388 | 11/1970 | Tu | 264/41 X |
| 3,539,389 | 11/1970 | Tu | 264/41 X |
| 3,565,982 | 2/1971 | Day | 264/53 |

*Primary Examiner*—Philip Anderson
*Attorney, Agent, or Firm*—Benjamin C. Pollard; Vincent A. White; Richard B. Megley

[57] ABSTRACT

Process for forming a microporous polyurethane body in which process a body of an emulsion is prepared of which the discontinuous phase is a non-solvent liquid and the continuous phase is a liquid polymeric material which sets through reaction to solid condition, the liquid emulsion is formed as a layer and reacted under conditions preserving the uniformity of the emulsion to form a resilient gel structure and the layer is subjected to physical pressure to express a substantial portion of the non-solvent liquid from the layer leaving a fine microporous structure after release of the pressure. The reaction is continued to advance the state of cure and any remaining non-solvent liquid is removed from the solidified layer.

5 Claims, 2 Drawing Figures

PROCESS FOR FORMING MICROPOROUS SHEET

FIELD OF USE, BACKGROUND AND PRIOR ART RELATIVE TO THE INVENTION

This invention relates to an improved process for making a microporous polyurethane body.

In the U.S. Pat. to John J. McGarr U.S. Pat. No. 3,551,364, dated Dec. 29, 1970, entitled "Processes for Making Microporous Polyurethane Bodies Employing Non-Boiling Liquid Alkyl Ethers or Liquid Aliphatic Hydrocarbons", there is disclosed a process in which liquid emulsion is formed in which the discontinuous phase is droplets of a non-solvent liquid and the continuous phase is a reactive polymeric material convertible through reaction to a tough, solid, resilient film-forming condition. The liquid emulsion is formed into a body of desired shape and reacted to solidify the reacted material with the droplets of non-solvent liquid held in the solidified body. The non-solvent liquid of the droplets is removed from the solidified body by evaporation and/or solvent extraction leaving spaces constituting openings or pores.

The process is effective to form an excellent product. However, by procedures shown in that patent, non-volatile materials in the liquid such as catalyst and other components remain in the micropores where they may contribute to hydrolytic instability of the material and, in solid form, may tend to block passages in the material. Additionally, and particularly in in the light of present-day concern for preventing escape of organic materials to the air, the removal of liquid from the product by evaporation presents serious problems both in complete removal of the non-solvent liquid from the sheet material and the complete condensation of liquid evaporated from the product to prevent its escape to the atmosphere.

SUMMARY OF THE INVENTION

It is an object of the present invention to provide a process for forming a microporous polyurethane body in which a non-solvent liquid phase is removed in liquid state from a resilient gelled continuous phase by by a simple inexpensive procedure effective to give improved water vapor permeability and resistance to hydrolysis in the polyurethane material, to shorten the time for liquid removal and to reduce liquid evaporation and recovery problems.

To this end and in accordance with a feature of the present invention liquid reactive urethane emulsion is cast as a layer and reacted at least until development of a resilient gel structure. Thereafter, the layer is subjected to physical pressure to express the non-solvent liquid discontinuous phase from the layer without destroying the cellular character of the urethane continuous phase.

BRIEF DESCRIPTION OF THE DRAWINGS

Reference is made to the attached drawings forming part of the disclosure of the present case in which.

DESCRIPTION OF THE PREFERRED EMBODIMENT

We have discovered a simple process for forming a microporous sheet in which water vapor permeability of the microporous sheet is improved and the cost of manufacture of microporous sheet material is reduced by casting a layer of an emulsion of which the liquid continuous phase is based on a polymeric material reactive to solid resilient condition and the dispersed phase is non-solvent liquid droplets. Reaction of the materials of the continuous phase is carried to a point, preferably short of complete curing, in which the continuous phase reaches a resilient state capable of substantially complete recovery from limited short time pressure. After this stage is reached, the sheet is subjected to physical pressure to expel at least a substantial portion of the liquid dispersed phase. Presently, preferred procedure for applying pressure is passing the sheet between the nip of pressure rolls to effect a controlled temporary reduction of thickness, and in the following description the process will be explained in its practice with this procedure. But, it will be understood that other procedures for applying pressure may be used.

Reactive emulsions for use in the present process may be similar to those shown in the earlier filed patent to McGarr referred to above, the disclosure of that patent as to components, proportions and procedures for forming and casting the emulsion being incorporated herein by reference.

The process will be described in connection with an apparatus suitable for the manufacture of the backed microporous sheet; but it is to be understood that an unbacked sheet may be formed and that the procedures may be carried out by hand or with other suitable apparatus.

Figure 1:
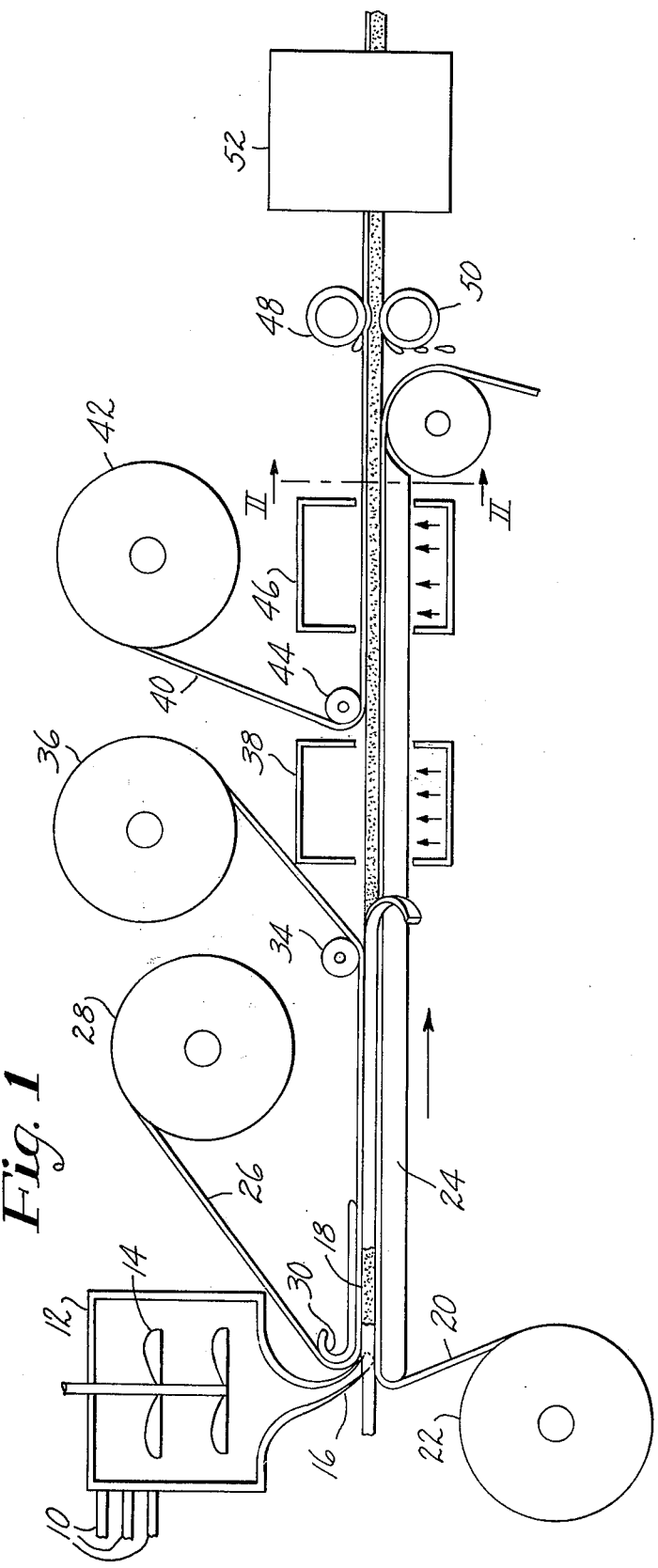
FIG. 1 is a diagrammatic elevational view of an arrangement of apparatus suitable for practicing the invention.

Referring to FIG. 1, polymeric reactants and non-solvent organic liquid to be mixed and emulsified are introduced through inlets 10 into the mixer-emulsifier 12 where they are acted on by the agitating blades 14. The resulting emulsion is discharged through the nozzle 16 and deposited as a layer 18 on the casting surface 20. In the form shown, the casting the casting surface 20 is a release sheet supplied from a roll 22. The release sheet casting surface 20 is moved suitably on a slip plate 24 beneath the nozzle 16 which deposits the emulsion on successive portions of the surface. Where the deposited emulsion is to be cooled, suitable cooling means (not shown) may be provided in the plate 24 beneath the sheet casting surface 20 carrying the layer 18 of the emulsion.

A flexible cover sheet 26 from the roll 28 is laid down on the emulsion carried by the casting surface. This may be done by feeding the cover sheet 26 around the curved member 30 which brings the cover sheet in contact with the edge of the nozzle 16 so that in effect, the release sheet 20 and cover sheet 26 with edge strips 32 at the edges of the release sheet 20 constitute a continuation of the nozzle to provide back pressure across the nozzle proper and effectively to eliminate shear movement in the emulsion layer 18. Preferably, the nozzle 16 is so designed that all portions of the emulsion have similar time and temperature histories at the time the emulsion leaves the nozzle proper and enters between spaced moving webs. The contacting surface of the cover sheet 26 preferably carries or provides a material giving a low adhesion interface between cover sheet 26 and emulsion layer 18 to minimize separational stress when the cover sheet is later removed and to insure that the adhesion of the layer 18 to cover sheet 26 is less than its adhesion to casting surface 20. The cover sheet 26 may be a release sheet such as a paper sheet carrying a non-adhesive deposit for example, of silicone, polytetrafluoroethylene, polychloro-trifluoroethylene, wax, polyethylene, or polypropylene or may be a non-adhesive, supported or unsupported resin or elastomer sheet. The cover sheet 26 is preferably flexible for convenience in handling and may be laid down on the emulsion layer 18 by hand or by any of the known devices for laying a sheet down smoothly on a surface. If desired, the cover sheet may be wet with an inert liquid, non-solvent for the continuous phase of the emulsion. This may be one of the liquids useful as the discontinuous phase. Alternatively, the cover sheet may be dusted with a powder not readily wet by the continuous phase or a liquid interface may be interposed between the cover sheet 26 and the emulsion layer 18 as by using a permeable cover sheet and forcing the liquid through the cover sheet. The cover sheet need not move with the emulstion in this case. The deposited emulsion is carried along undisturbed after leaving the nozzle 16 with the surfaces of the emulsion layer 18 protected by the cover sheet 26, release sheet 20 and edge strips 32.

With the cover sheet 26 in place, the reaction of the polymeric material rapidly produces a preliminary gel structure in which the emulsion has sufficient stability that the stripping of the cover sheet does not disrupt or distort the surfaces of the emulsion from which it is stripped.

The cover strip 26 is then drawn up from the surface of the emulsion layer 18 around the roller 34 and is wound up on the roll 36. The location of the roller 34 which draws the cover sheet 26 away from the layer 18 is determined by the requirement of maintaining back pressure to give proper flow characteristic to the nozzle and by the rate at which the emulsion thickness and reaches the preliminary gel stage allowing the cover sheet to be withdrawn without disruption of the layer 18.

Figure 2:
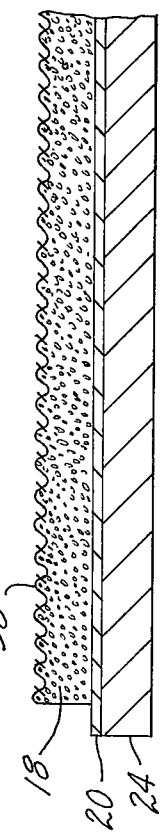
FIG. 2 is a fragmentary sectional elevational view taken on the line II—II of FIG. 1 of a cast layer with casting surfaces and cover sheet as may be formed on the apparatus of FIG. 1.

After the cover sheet is withdrawn and after further time dwell suitably in a temperature controlled chamber 38, if needed for additional thickening of the emulsion to prevent undesired sinking in of the backing, fibrous backing material 40 is pressed down onto the emulsion layer 18. The backer materials may be practially any fabric which does not have chemical activity which would interfere with the ongoing action and which does not carry a surface active material which would influence the surface active balance of the emulsion. These materials include woven and non-woven fabrics. The non-woven fabrics may be needle punched, knit stitched, impregnated or resin bonded. The fabrics may be napped or unnapped. A very useful material includes napped and sheared sateen but plain sateen, cotton drill and other weave knits may be used. Backers have been made of rayon, polyester, polypropylene, nylon, cotton filaments and other fibers and combinations. It has been found desirable to pre-wet the backing material 40 with an inert liquid non-solvent for the continuous phase, e.g. liquids suitable for the disperse phase of the emulsion, before associating the backing material with the emulsion layer. This may be done by dipping the fabric in the liquid and passing it through a wringer prior to winding it into the roll 42. As shown in the drawing, the fibrous backing 40 from the roll 42 is fed around the roller 44 which presses it against the surface of the emulsion layer 18 to form the assembly shown in FIG. 2.

After the fibrous backing 40 has been pressed onto the surface of the emulsion layer 18, the composite is carried along through a temperature controlled chamber 46 to allow the reaction to proceed at least to the stage of a gel having a resilience such that the layer will return substantially to its original thickness when pressed as between squeeze rolls to about 50% of its original thickness. At this point, the composite of solidified emulsion layer 18 and fibrous backing 40 may be stripped from the release sheet 20 for further treatment.

In the apparatus shown in FIG. 1 the gelled emulsion layer and backing are passed between squeeze rolls 48 and 50 momentarily to reduce the cross section of the layer 18 and expel a substantial proportion of the non-solvent liquid from the spaces previously occupied in the solidified continuous phase and to remove the liquid from the sheet. This expulsion of the dispersed liquid both clears pores and passageways and carries out of the sheet materials dissolved or carried in the liquid. After having been pressed, the sheet is passed through the curing oven 52 where it is further reacted if necessary to complete the cure and residual liquid is removed, usually by evaporation.

It has been found that sheets prepared from certain formulations so treated may have several times greater water vapor permeability than a sheet from which all of the dispersed liquid is removed by evaporation. This is believed to be due at least in part to opening up of the passageways by the forced expulsion of liquid and, at least in some cases, to removal of dissolved matter, particularly the substantial elimination of the precursor of solid hydrophobic material, believed to be a complex of tin catalyst and isocyanate material, present in dissolved form in the dispersed liquid. Finally, evaporation of residual liquid and completion of cure occur more rapidly and more completely in sheet material from which the liquid has been expressed, while at the same time other physical properties of the sheet appear to be unaffected.

The definition of the precise stage at which the solified emulsion layer may be subjected to the step of pressing to expel non-solvent liquid is difficult and is generally determined empirically. That is, the presently preferred pressure device for expelling liquid is a roller or a pair of opposed rollers which squeeze the sheet material. It has been found desirable to effect this pressure step as soon as possible to limit the development of solid insoluble material, believed to be a complex of isocyanate and catalyst material particularly where a tin catalyst material used in the one shot system. This complex develops progressively and its precipitation from the non-solvent liquid in the droplets in the emulsion layer is a function of time. Most effective removal is accomplished before the complex has had time for complete precipitation with the development of larger particles. A further factor in favor of the early separation of non-solvent liquid is the ease with which the incompletely reacted material can be compressed.

With the recognition that early application of pressure to remove a non-solvent is desirable, the location of the pressure rolls or other device for expelling liquid from the sheet is determined relative to the manufacturing line by experimental determination of the point at which the layer may be subjected to squeezing without substantial permanent deformation. This is the point where the resilience and stability of the gelled emulsion layer enables recovery in thickness of the layer so that the final layer will have lost less than about 10% in thickness.

The extent of deformation will vary somewhat with the reagents combined to form the continuous phase. In general the sheet should be capable of withstanding the deformation produced by passing the sheet between 4 inch diameter squeeze rolls with a compression force on the rolls of at least about 75 pounds per linear inch of sheet width with less than 10% loss in thickness in the dried product of squeezing will remove from at least about 40% of the non-solvent liquid component. Because of changes occurring in the sheet, it is desirable to squeeze the sheet promptly after the sheet will resist the squeeze pressure. Because of the incomplete reaction of the components of the continuous phase, it is preferred that this compression be short in duration, and, where it is desirable to remove the maximum amount of non-solvent liquid, a plurality of squeeze rolls may be arranged in succession.

In a further modification, the squeeze rolls may be disposed so that the sheet material leaving the nip of the rolls enters directly into a bath of wash liquid. This wash liquid is one which has low viscosity and surface tension for ready entrance into the pores and passageways of the sheet material when presence on the sheet material is released and which has little or no solvent or swelling action toward the sheet material. The wash liquid may be the same liquid as employed for the discontinuous phase, or another liquid from the class disclosed as useful in this relation or may be a liquid of higher volatility or greater extractive power toward materials desired to be removed from the sheet material. Since the isocyanate groups initially present in the emulsion have largely reacted, it is also possible to use liquids such as alcohols which might be undesirable for use as the discontinuous phase because of groups reactive with isocyanates.

Reactive materials for use in the solidified continuous phase are those for forming elastomeric polyurethane or polyurea reaction products, both of which are hereafter referred to as polyurethanes, and are selected on the basis of their ability to provide toughness, flexibility, hardness and other physical properties required in the final product. The reactive material may be a "one shot" mixture of an organic compound having at least two active hydrogens such as a polymeric polyol, e.g. polyalkylene ether polyol and/or polyester polyol with a reactive compound having at least two reactive -NCO groups, e.g. a polyisocyanate. Alternatively, there may be used a prepolymer system in which an -NCO terminated reaction product of a polyol with excess polyisocyanate is combined with chain extenders which may be polyhydroxy or polyamine or amino alcohol compounds having at least two hydroxyl or amine groups providing active hydrogens for reaction with -NCO groups.

It has been found desirable to use polyol material or prepolymers which at room temperature are solid or pasty and which are emulsified in heat fluidified condition. These materials offer the special advantage that cooling of the emulsion after formation into a layer helps to thicken the emulsion layer to aid in resisting distortion when the cover sheet 26 is removed.

Polyols useful in the "one shot" mixture or for forming the reactive prepolymer include substantially linear or only moderately branched polyether polyols, and substantially linear or moderately branched polyester polyols.

Suitable non-solvent, pore-forming liquids may readily be selected by a chemist on the basis of the known physical properties of liquids. Any liquid having substantial non-solvency and non-reactivity with the polymeric material together with suitable volatility characteristics may be used. Normally liquid aliphatic hydrocarbons including petroleum hydrocarbon fractions are generally preferred because of their low cost and satisfactory behavior in the composition; but other substantially inert organic liquids such as liquid alkyl ethers, e.g. amyl ether and dibutyl ether and liquid halogenated hydrocarbon may be used. To avoid premature evaporation from the body of emulsion so that it can serve its space filling function until the emulsion has solidified, the pore-forming liquid is chosen to have a boiling point above the selected mixing and reaction temperatures and should preferably have a boiling point of at least about 100°C. and preferably at least 130°C. to allow use of temperatures giving a desirable fluidity and rate of reaction of the polymeric material. On the other hand, the liquid is preferably one with low enough boiling point for removal of residual portions without heat injury to the solidified body or to a base with which it may be associated. Thus, the liquid should ordinarily not contain substantial quantities of high boiling or low volatility components, and preferably at least 90% of the components should boil at temperatures below 232°C. It is to be understood that other means than evaporation e.g. extraction, may be used to remove residual liquid and in such cases the upper limit of boiling point does not apply.

The extent of heating of the reactive polymeric material needed to bring the material to a suitably low viscosity, which may be of the order of 6000 cps., for emulsion forming, depends on the properties of the material. Higher melting point and higher molecular weight reactive polymeric materials require higher temperatures. Polymeric materials giving the desired improvements in retention of uniform droplet distribution of the emulsion in layer form call for heating to a temperature of at least about 50°C.

Dispersion of droplets of the pore-forming liquid in the heated liquid body of reactive polymeric material to form an emulsion in which the reactive polymeric material is the continuous phase, is effected by vigorous agitation during the course of addition of the pore-forming liquid to the body of polymeric material. Surface active agents are useful to aid in dispersing the liquid in the polymeric material and to control the stability of the resulting emulsion. Preferred emulsifying agents have included anionic and non-ionic surface active agents such as commercially available silicone emulsifiers, polyoxyalkylene ethers such as a commercial polypropoxy/polyethoxy ether, partial long chain fatty acid esters and the polyoxyalkylene derivatives of such esters, also sulfuric acid esters of long chain fatty alcohols, etc.

The amount of pore-forming liquid dispersed will vary with the desired porosity of the final product and may vary from as low as, based on parts by weight, 25 parts of the liquid to 100 parts of the polymer up to as high as 300 parts of the liquid to 100 parts of the polymer material. It is preferred to use from about 60 parts to about 200 parts of liquid to 100 parts of the polymeric material. It is desirable that the mechanical conditions of dispersion of the liquid and the polymer be controlled to form very small droplet sizes of which the majority will be in the range of from 0.001 mm. to about 0.03 mm. in diameter.

Reaction of the polymeric material to higher molecular weight solid condition is brought about and controlled by the time and temperature conditions of bringing together of the reactive components and/or by the introduction of catalyst. In the one step process in which a polymeric polyol such as the polyester polyol or polyether polyol is reacted with a polyisocyante, mixing and emulsification involves bringing together these materials together with the liquid to be dispersed and a catalyst effective to control the reaction rate.

In the two step process, an -NCO terminated prepolymer prepared from a polymeric polyol such as an hydroxyl terminated polyether or polyester and a polyiscyanate, the pore forming liquid, and chain extenders reactive with the prepolymer to give higher molecular weight materials are combined and emulsified, with the prepolymer material forming the continuous phase. Chain extenders effective to increase the molecular weight of the prepolymer are compounds having two or more active hydrogen atoms such as p,p'-methylenedianiline, 4,4'-methylene-bis-(2,-chloraniline), trimethylolpropane, m-phenylediamine, 1,4-butanediol and triethanolamine.

Control of the reaction to insure reaching the desired partial gellation by the time the cover sheet is stripped off may be controlled by such factors as temperature, catalyst and rate of speed of the conveyor. The known catalysts for urethane reactions may be used. It has been found particularly desirable to use a catalyst having an induction period during which no important physical changes occur in the reaction mixture so that in the present process mixing and deposition as a layer 18 between the casting sheet 20 and the cover sheet 26 occurs before preliminary gellation has begun, while at the same time, once the induction period has passed, the catalyst is effective to complete the cure of the urethane in a minimum time. As the catalyst having an induction period there may be used mercuric salts of aliphatic and/or aromatic carboxylic acids. This catalyst may be used in amount of from about 0.01 percent to about 0.4 percent, preferably about 0.10 percent by weight based on the weight of the resin.

With this catalyst there may be used a catalyst effective to cause rapid but limited initial build up in viscosity or precursor gellation. Such catalysts may include triethylene diamine, N,N,N'N'-tetramethylene butane diamine, dibutyl tin dilaurate, stannous octoate and lead naphthenate. These materials will ordinarily be used in proportion of from about 0.002 percent to about 0.7 percent by weight based on the weight of the resin.

The use of a rapid catalyst such as a tin compound is believed to reduce the disparity between the rate of reaction of the isocyanate and the polyester or polyether polyol on the one hand and the rate of reaction between the isocyanate and the short chain diol modifier on the other hand and to give best product quality. Rapid catalysts are also effective to speed up the reaction between the isocyanate with hydroxyl terminated compounds so that any tendency for the isocyanate to be extracted into the inert liquid of the discontinuous phase is reduced. The rapid reaction also enables the cover sheet 26 to be removed in a very brief space and the combination of rapid catalyst and catalyst having an induction period operates so that the composite of fibrous backing sheet 38 and solidified emulsion layer 18 will reach a condition in which it can be handled in a minimum time.

The following example is given to aid in understanding the invention, but it is to be understood that the invention is not restricted to the materials, purposes or procedures of the example.

EXAMPLE

Using an apparatus such as that shown in FIG. 1, the following components are supplied to a continuous mixer at the rates given in the following table:

| Components | Grams per Minute |
| --- | --- |
| polyester polyol | 1,000 |
| 1,4 butanediol | 89.4 |
| liquid paraffinic hydrocarbon | 1,618 |
| p,p'-diphenylmethane diisocyanate | 523.8 |
| surfactant | 5 |
| dibutyl tin dilaurate | .06 |
| phenyl mercuric propionate | 5 |

The polyester polyol is a normally solid at room temperature hydroxyl terminated polybutylene adipate having an equivalent weight of 503.6 and providing 1.987 -OH equivalents.

The liquid hydrocarbon has a boiling range of 346°F. to 405°F. The surfactant is a polyoxyalkylene ether. The above mixture has an -NCO to -OH ratio of 1.05:1. The components are brought to a temperature of 60° so that they are liquid when introduced into the mixer and are emulsified to form a fine dispersion of the hydrocarbon liquid in the continuous phase of the reactive components and the emulsifier is discharged from a nozzle to form a layer between a casting sheet and a cover sheet. An average of about 1¼ minutes elapses between introduction of the materials to the mixer and deposition from the nozzle. The layer is passed to a chamber maintained at about 90°C. and is removed from the chamber about 1½ minutes after the deposition. The cover sheet is then stripped off and a fabric backer laid into the pre-gelled material. The assembly of the backer and reactive emulsion is then passed through a chamber held at a temperature of 110°C. for about 3½ minutes and the assembly of backer and layer of reactive emulsion, which is in an at least partially cured gelled state, is stripped from the casting surface. After about 2½ minutes from the time it leaves the 110° chamber, the combined backer and at least partially cured urethane layer is passed between 8 inch rollers which press it to about ½ its thickness and expel a substantial portion of the hydrocarbon liquid from the combined sheet. On leaving the rolls, the sheet returns to substantially the thickness it had before rolling and is then passed through a drying and cure oven at 110°C. where curing is completed and residual hydrocarbon liquid is removed by evaporation.

Having thus described our invention, what we claim as new and desire to secure as Letters Patent of the United States is:

1. In the process of forming a microporous sheet of solid polyurethane comprising the steps of casting an emulsion of fine droplets of a volatile organic liquid as the internal phase in a continuous phase comprising reactive material convertible through reaction to solidified, resilient polyurethane, said organic liquid being substantially non-solvent for and non-reactive with said reactive material, being immiscible in said continuous phase and being present in amount from about 60% to about 300% by weight based on the weight of the reactive material, said organic liquid containing catalytic or other non-volatile materials which are undesirable in the final sheet, reacting said material at a temperature below the boiling point of said liquid so that the liquid never boils to cause the emulsion to gel and solidify with said droplets held in the solidified material and removing said liquid without expanding the solidified material leaving pores and discontinuities in the solidified material to constitute passageways for air and vapor, the improvement which comprises forming a layer of the liquid emulsion, reacting the materials of the continuous phase of the emulsion to a resilient state capable of return to substantially its initial thickness when pressed to 50% of its initial thickness under conditions preserving the uniformity of the emulsion, subjecting the resilient material to physical pressure of short duration promptly after reaching said resilient condition and before completion of said reaction to express from said sheet a substantial portion of said non-solvent liquid together with materials dissolved or carried in said non-solvent liquid and to clear pores and passageways, completing said reaction to form a stable solid body and removing further organic liquid from the solidified material.

2. The process of forming a microporous sheet of solid polyurethane as defined in claim 1 in which said layer of emulsion is subjected to physical pressure to express at least about 40% of the non-solvent liquid promptly after reaction to a stage in which said physical pressure will cause less than 10% permanent loss in thickness in the sheet.

3. The process of forming a microporous sheet of solid polyurethane as defined in claim 2 in which said physical pressure is applied by passing said layer between rolls.

4. The process of forming a microporous sheet of solid polyurethane as defined in claim 3 in which said emulsion is introduced between spaced release surfaces to form a layer while said emulsion is liquid and in which one of said release surfaces is stripped from said layer of emulsion when said emulsion has thickened to a stage where the emulsion is no longer freely liquid and maintains undeformed the surface from which the release surface is stripped and thereafter the layer is subjected to said physical pressure to express said non-solvent liquid.

5. The process of forming a microporous sheet of solid polyurethane as defined in claim 4 in which a fibrous backer sheet is laid on the surface of said layer of emulsion after stripping said release surface when said emulsion has reached a pre-gelled stage in which it is sufficiently fluid to wet and adhere to said backer sheet but sufficiently thick to prevent said backer sheet from sinking, said layer of emulsion is further reacted to said resilient state suitable for expression of said non-solvent liquid and the combined backer sheet and layer of emulsion is subjected to pressure to remove non-solvent liquid.

* * * * *